United States Patent [19]

Erwied et al.

[11] Patent Number: 4,686,255
[45] Date of Patent: Aug. 11, 1987

[54] STABILIZED POLYVINYL CHLORIDE MOLDING COMPOSITIONS

[75] Inventors: Werner Erwied, Langenfeld; Horst Upadek, Erkrath; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 732,101

[22] PCT Filed: Aug. 30, 1984

[86] PCT No.: PCT/EP84/00262
§ 371 Date: May 3, 1985
§ 102(e) Date: May 3, 1985

[87] PCT Pub. No.: WO85/01053
PCT Pub. Date: Mar. 14, 1985

[30] Foreign Application Priority Data
Sep. 5, 1983 [DE] Fed. Rep. of Germany ....... 3332003

[51] Int. Cl.$^4$ ............................ C08K 5/37; C08K 5/34
[52] U.S. Cl. ................................. 524/104; 252/400.3; 524/303; 524/320; 524/356; 524/450
[58] Field of Search ............... 524/567, 569, 320, 437, 524/104, 356, 357, 450, 303; 562/577, 578; 252/400.3

[56] References Cited

U.S. PATENT DOCUMENTS

| | | | |
|---|---|---|---|
| 2,574,987 | 11/1951 | Shelley | 524/104 |
| 2,669,548 | 2/1954 | Darby et al. | 524/405 |
| 2,954,362 | 9/1960 | Wilson | 524/303 |
| 3,346,536 | 10/1967 | Kauder et al. | 524/569 |
| 3,398,114 | 8/1968 | Pollock | 524/182 |
| 4,000,100 | 12/1976 | Baldyga | 524/456 |
| 4,172,207 | 10/1979 | Mack | 548/544 |
| 4,371,656 | 2/1983 | Kashiwase et al. | 524/450 |
| 4,427,816 | 1/1984 | Aoki et al. | 524/320 |

FOREIGN PATENT DOCUMENTS 771857 4/1957 United Kingdom .

OTHER PUBLICATIONS

Stapfer et al—"Antioxidative Stabilization of PVC" ACS, Div. Polymer Chem., Polymer Preprints, Mar. 1971, vol. 12, No. 1, 795–802.

*Primary Examiner*—Veronica P. Hoke
*Attorney, Agent, or Firm*—Henry E. Millson; Mark A. Greenfield; Real J. Grandmaison

[57] ABSTRACT

Stabilized polyvinyl chloride molding compositions contain, per 100 parts by weight of polymer, 0.02 to 5 parts by weight compounds of Formula I,

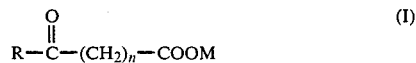

in which R represents an alkyl group with 1 to 19 carbon atoms, a cycloalkyl group with 5 or 6 carbon atoms, a phenyl group, an alkylphenyl group with 7 to 11 carbon atoms or an MOOC—CH$_2$ group, n represents the numbers 0 and 1, and M represents sodium or potassium.

Heat stabilizers which are metal soaps, aromatic metal carboxylates, metal phenolates and organotin compounds as well as crystalline sodium aluminosilicate are also incorporated.

8 Claims, No Drawings

STABILIZED POLYVINYL CHLORIDE MOLDING COMPOSITIONS

The invention pertains to stabilized thermoplastic molding compositions on the basis of polyvinyl chloride or essentially vinyl chloride-containing polymers.

In the molding of thermoplastic polymers into pipes, bottles, profiles, films, and the like, for example by extrusion, injection molding, blowing, deep drawing and calandering, degradation of the plastic can easily take place at the high temperatures thus occurring. This leads to undesirable discolorations and a reduction of the mechanical properties. For this reason stabilizers are added to the polymers prior to thermal deformation to prevent such degradation. Thermal stabilizers used for polyvinyl chloride and essentially vinyl chloride-containing mixed polymers principally include inorganic and organic lead salts, organic antimony compounds, organotin compounds, as well as cadmium/barium carboxylates and phenolates. The metal compounds mentioned are usually designated as primary stabilizers; to improve their efficacy, secondary stabilizers or costabilizers are frequently added to them. Further details regarding the thermal stabilizers customarily employed for vinyl chloride polymers can be taken from the relevant literature, for example the *Encyclopedia of Polymer Science and Technology*, Vol. 12, New York, London, Sydney, Toronto 1970, pp. 737 to 768.

In practice the stabilizers mentioned show completely satisfactory effects. However, certain objections exist against the use of lead, antimony and cadmium compounds, especially from the toxicologic viewpoint. A number of organotin compounds are pathologically safe, but broader use of these is impeded by their high price. For this reason attempts have long been made to replace these compounds with safer and less expensive substances. In this connection a change was made to using as the primary stabilizers fatty acid salts of aromatic carboxylates and phenolates of the metals calcium, barium, zinc and aluminum, possibly supplemented by costabilizers, e.g., organic phosphites, imino compounds, epoxy compounds, polyvalent alcohols or 1,3-diketones. However, these newer stabilizer systems involve to a greater or lesser degree the defect that they impart inadequate initial stability and/or inadequate long term stability to the molding compositions to be stabilized. Therefore a need exists for substances with the aid of which the initial and/or long term effect of such stabilizers can be decisively improved.

It was found that alkali salts of 2-oxo- and 3-oxo-carboxylic acids can be successfully employed to stabilize polyvinyl chloride molding compositions. In particular it was found that these salts of oxocarboxylic acids are able to increase the stabilizing action, especially the long term effect of primary stabilizers on the basis of soaps, aromatic carboxylates and phenolates of the metals calcium, barium, zinc and aluminum as well as of organotin compounds to an unexpected degree.

Thus the subject of the invention comprises stabilized polyvinyl chloride molding compositions containing compounds of Formula I

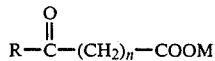

$$R-\overset{O}{\underset{\|}{C}}-(CH_2)_n-COOM \qquad (I)$$

in which R represents an alkyl group with 1 to 19 carbon atoms, a cycloalkyl group with 5 or 6 carbon atoms, a phenyl group, an alkylphenyl group with 7 to 11 carbon atoms, or an MOOC—$CH_2$ group, n represents the numbers 0 or 1, and M represents lithium, sodium or potassium.

In particular the object of the invention comprises stabilized molding compositions which contain a stabilizer combination consisting of (1) primary stabilizers selected from the group consisting of metal soaps, aromatic metal carboxylates, metal phenolates, and organotin compounds, and (2) compounds of Formula I as costabilizers as well as the usual lubricants and possibly other processing aids.

Additional objects of the invention include stabilizer combinations for polyvinyl chloride molding compositions containing primary stabilizers selected from the group consisting of metal soaps, aromatic metal carboxylates, metal phenolates and organotin compounds and compounds of Formula I as costabilizers, the usual lubricants and other usual processing aids if desired, The compounds of Formula I involve known substances. If these compounds or the free acids on which they are based are not commercially available, they can be manufactured according to known methods of organic synthesis.

The salts of 2-oxocarboxylic acids defined by Formula I with n=0 can be obtained, for example, by condensation of carboxylic acid esters with oxalic acid esters and subsequent ketone cleavage (see Houben-Weyl: *Methoden der Organischem Chemie* (*Methods of Organic Chemistry*), Vol. 8, pp. 581 f and 435 f, 1952).

The salts of 3-oxocarboxylic acids, for example, described by the Formula I with n=1, are obtainable by a solution of acetates with carboxylic acid chlorides, subsequent cleavage by the alcoholate (see Houben-Weyl: *Methoden der Organischem Chemie* (*Methods of Organic Chemistry*), Vol. 8, pp. 610 f and pp. 616, as well as *J. Am. Chem. Soc.*, Vol. 72, p. 1231, 1950) and gentle hydrolysis in dilute alkaline medium (*Org. Synth. Coll.*, Vol. 1, p. 351, 1948).

Metal soaps in connection with the invention are understood to include fatty acid salts of calcium, barium, zinc and aluminum. These metal soaps are preferably derived from fatty acids with 8 to 22 carbon atoms. The fatty acid component in this process can consist especially of caprylic, capric, lauric, myristic, palmitic, stearic and behenic acids. In addition branched-chained fatty acids such as 2-ethylhexanoic acid, 2-hexyldecanoic acid, and 2-octyldodecanoic acid, as well as hydroxy fatty acids, for example, 9,(10)-hydroxystearic acid, 9,10-dihydroxystearic acid and 9(10)-hydroxy-10(9)-methoxystearic acid come under consideration. The compositions in accordance with the invention can contain salts of individual fatty acids or salts of fatty acid mixtures as obtained from natural fats and oils.

The principal aromatic metal carboxylates coming under consideration are the calcium, barium, zinc and aluminum salts of benzoic acid and substituted benzoic acids, especially alkyl-substituted benzoic acids.

Metal phenolates coming under consideration are phenolates, alkylphenolates and naphthenates of calcium, barium, zinc and aluminum. So-called superbasic phenolates or naphthenates are also usable additions.

Principal organotin compounds coming under consideration are the dialkyl compounds of tetravalent tin, for example dimethyltin-S,S-bis-(isooctylthioglycolate), dibutyltin dilaurate, dibutyltin maleate, dibutyltin-bis-(monobutylmaleate), dibutyltin bis-(laurylmercaptide), dibutyltin-β-mercaptopropionate, dibutyltin-S,S-bis-(isooctylthioglycolate), di-n-octyltin maleate, di-n-octyltin-S,S-bis-(monoethylmaleate), di-n-octyltin-β-mercaptopropionate and di-n-octyltin-S,S-bis-isooctyl-thioglycolate), as well as monoalkyltin compounds, e.g., monomethyltin tris-(isooctylthioglycolate) and mono-n-octyltin tris-(isooctylthioglycolate), wherein the monoalkyl compounds of the tretravalent tin are preferably used in mixtures with dialkyl tin compounds.

As a rule the stabilized polyvinyl chloride molding compositions containing for each 100 parts by weight of polymer, 0.02 to 5 parts by weight of compounds of Formula I. The metal soaps, aromatic metal carboxylates and metal phenolates can be present in quantities of 0.05 to 5 parts by weight per 100 parts by weight of polymer.

In a specific embodiment of the invention, the polyvinyl chloride molding compositions contain 0.1 to 3 parts by weight calcium soap per 100 parts of weight of polymer and/or 0.1 to 3 parts by weight of barium soap and/or 0.1 to 3 parts by weight of zinc soap, wherein the soaps are preferably derived from fatty acids with 8 to 22 carbon atoms, and the total share of the metal soaps normally does not exceed 3 parts by weight per 100 parts by weight of polymer.

In many cases it may be advantageous to add to the polvinyl chloride composition for each 100 parts by weight of polymer, 0.2 to 5 parts by weight of a synthetic, crystalline, finely divided sodium aluminosilicate containing 13 to 25% by weight of bound water which—based on the anhydrous form—has the composition 0.7–1.1Na$_2$O.Al$_2$O$_3$.1.3–2.4SiO$_2$.

The above-defined sodium aluminosilicates involve zeolites of the type NaA, which have an average effective pore diameter of 4 Å, for which reason they are also designated as zeolites 4 A. The use of these zeolites as auxiliaries in the processing of thermoplastics is known, see for example U.S. Pat. No. 4,000,100 and European Patent Application No. 0027,588.

It may also be advantageous to add to the polyvinyl chloride molding composition, per 100 parts by weight of polymer, 0.2 to 5 parts by weight of compounds of Formuls II and/or III

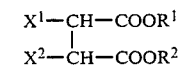

(II)

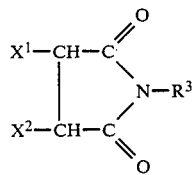

(III)

in which X$^1$ and X$^2$ independently represent hydrogen or the SH group, wherein at least one of the substituents X$^1$ and X$^2$ represents an SH group and in which R$^1$, R$^2$ and R$^3$ represent straight-chain and branched alkyl groups with 5 to 22 carbon atoms, preferably 6 to 18 carbon atoms.

The compounds of Formulas II and III represent known substances, which can be obtained according to available methods of organic synthesis.

The dialkyl esters of mercaptosuccinic acid and 2,3-dimercaptosuccinic acid designated by Formula II are advantageously prepared by esterification of the mercapto-substituted succinic acids with corresponding alkanols, possibly in the presence of esterification catalysts according to the procedures customary for the esterification of carboxylic acids with alcohols (see, for example, Houben-Weyl: *Methoden der Orgnischen Chemie.* (*Methods of Organic Chemistry.*) Fourth Edition, Vol. 8, Stuttgart, 1952 pp. 516–527).

The N-alkylimides of mercaptosuccinic acid and 2,3-dimercaptosuccinic acid defined by Formula III can be obtained, for example, by reacting the mercaptosubstituted succinic acids, their esters or anhydrides with corresponding alkylamines. With regard to the condition to be maintained in this connection, see Houben-Weyl: *Methoden der Organischen Chemie.* (*Methods of Organic Chemistry.*) Fourth edition, Vol. 11/2, Stuttgart 1958, pp. 4–9 and 20–25, as well as *Methodicum Chimicum*, Vol. 6, Stuttgart 1975, pp. 681–682.

In addition to the known additives the polyvinyl chloride molding compositions in accordance with the invention can contain partial esters of polyols with 2 to 6 carbon atoms and 2 to 6 hydroxyl groups and fatty acids with 8 to 22 carbon atoms as lubricants with stabilizing effect. These partial esters have, on the average, per molecule at least one free polyol-hydroxyl group and can be produced by esterification of corresponding polyols with fatty acids of the given chain lengths, possibly in the presence of customary esterification catalysts. Polyols and fatty acids are reacted together in this process in a molar ratio of 1:1 to 1:(n−1), wherein n signifies the number of hydroxyl groups in the polyol. The components are preferably used in such quantities that partial esters with an OH number between 140 and 580, especially between 170 and 540, are formed. The reaction product, which in each case represents an ester mixture, should have an acid number of less than 15, preferably less than 8. Suitable polyol components are ethylene glycol, propylene glycol-1,2, propylene glycol-1,3, butylene glycol-1,2, butylene glycol-1,4, hexanediol-1,6, neopentyl glycol, trimethylolethane, erythritol, mannitol and sorbitol as well as in particular glycerin, trimethylolpropane, ditrimethylolpropane, pentaerythritol and dipentaerythritol. Suitable fatty acid components include, for example, caprylic, capric, lauric, myristic, palmitic, stearic and behenic acids. Synthetic fatty acids of the carbon numbers mentioned or unsaturated fatty acids, such as oleic and linolenic acids, or substituted fatty acids, especially hydroxylated acids such as 12-hydroxystearic acid, may also be used. For practical reasons fatty acid mixtures are generally employed, as are obtained from the natural fats and oils.

The polyvinyl chloride molding compositions in accordance with the invention contain the polyol partial esters, as a rule, in quantities of 0.2 to 2.0 parts by weight per 100 parts by weight of polymer.

It may also be advantageous when the polyvinyl chloride molding compositions in accordance with the invention contain thioglycolic acid esters of alcohols with 1 to 6 hydroxyl groups and 3 to 36 carbon atoms. Here, thioglycolic acid esters of relatively low volatility come under consideration, for example thioglycolic acid esters obtained from glycerin, trimethylolpropane, isomeric octanols, decanol, the Guerbet alcohols from octanols, or technical dimerized fatty alcohol. These exters can also contain free hydroxyl groups; it is likewise possible to use mixtures of thioglycolic acid esters and free polyvalent alcohols.

The polyvinyl chloride molding compositions in accordance with the invention can contain the thioglycolic acid ester mentioned in quantities of 0.1 to 10 parts by weight per 100 parts by weight of polymer.

In addition if desired an advantageous effect can be achieved if 1,3-dicarbonyl compounds are present in the polyvinyl chloride molding compositions in accordance with the invention. In general, 1,3-diketones comes under consideration which contain at least two aryl or aralkyl groups, for example dodecyl, hexadecyl, octadecyl, phenyl or benzyl groups in the molecule. Typical representatives of this class of substances are palmitoylstearoyl methane and stearoylbenzoyl methane.

The polyvinyl chloride compositions in accordance with the invention may contain such 1,3-dicarbonyl compounds in quantities of 0.1 to 5 parts by weight per 100 parts by weight of polymer.

The polyvinyl chloride molding compositions in accordance with the invention can contain additional auxiliaries and processing aids, particularly waxy hydrocarbons such as paraffins with a solidification point in the range from 40° to 105° C. and/or lower molecular weight polyethylene types, the softening points of which should be below 140° C. These waxy substances are advantageously combined with free fatty acids, wherein fatty acids with 12 to 22 carbon atoms, as are available from natural fats and oils, are preferred. Especially favorable results are obtained with palmitic and stearic acids. Commercial fatty alcohols with 12 to 22 carbon atoms can also be present in the thermoplastic molding compositions in accordance with the invention.

Additional additives coming under consideration include certain polymers, for example those on the basis of methyl methacrylate, methyl methacrylate/butylacrylate, ethyl acrylate, methyl methacrylate/acrylic acid and butyl methacrylate/styrene. Such polymers and copolymers are designed as flow promoters. Butylacrylate polymers also serve as parting agents in the shape-imparting processing of polyvinyl chloride molding compositions.

In certain cases it may be advantageous if the polyvinyl chloride molding composition in accordance with the invention contains antioxidants. Compounds coming into consideration in this connection include for example diphenylol propane, 2,5-bis-(1,1-dimethylpropyl)-hydroquinone, 2,6-di-tert.-butyl-4-methylphenol, octadecyl-(3,5-di-tert.-butyl-4-hydroxyphenyl)-propionate, 1,1,3-tris(5-tert.-butyl-4-hydroxy-2-methylphenyl)-butane or dilauryl thiodipropionate.

Polyvinyl chloride molding compositions intended for the manufacture of hollow articles and films may contain, per 100 parts by weight of polymer, 0.5 to 5 parts by weight expoxidized soy oil and 0.1 to 0.8 parts by weight of higher molecular ester wax. Higher molecular weight ester waxes coming under consideration are Montan wax, paraffin oxidates and complex esters.

The basis of the stabilized thermoplstic molding compositions in accordance with the invention consists of homopolymers or mixed polymers of vinyl chloride. The mixed polymers contain at least 50 mol-%, preferably at least 80 mol-% vinyl chloride. The polymers can have been produced in any desired way, for example by suspension, emulsion or block polymerization. Their K value can be between about 35 and 80. Molding compositions on the basis of postchlorinated polyvinyl chloride as well as those on the basis of resin mixtures predominantly containing homopolymers or copolymers of vinyl chloride fall within the scope of the invention. The term, polyvinyl chloride molding compositions, in accordance with the invention covers both the semifinished products intended for molding and the articles molded in any desired way from these compositions.

The individual components of the polyvinyl chloride molding compositions in accordance with the invention can be combined by mixing the components in conventional mixtures. In this connection it is possible first to mix the various components of the stabilizer combination with one another and then to combine this mixture with the polyvinyl chloride base agent.

The stabilizer combinations in accordance with the invention for polyvinyl chloride molding compositions in the simplest case consist of a primary stabilizer selected from the group consisting of metal soaps, aromatic metal carboxylates, metal phenolates and organotin compounds and a compound of Formula I.

A specific embodiment of the invention provides stabilizer combinations in which, per part by weight of the compounds of Formula I, 0.5 to 10 parts by weight of calcium soaps and/or 0.5 to 10 parts by weight barium soaps and/or 0.5 to 10 parts by weight zinc soaps are present wherein the soaps are derived from fatty acids with 8 to 22 carbon atoms. The total share of the metal soaps mentioned in this connection should not exceed 20 parts by weight per part by weight compounds of Formula I.

As additional basic components of the stabilizer combinations in accordance with the invention, the previously described sodium aluminum silicates come into consideration; they may be present in quantities of 0.2 to 10 parts by weight per part by weight compounds of Formula I. The stabilizer combinations preferably contain at least one lubricant from the group of the above-defined partial esters of fatty acids and polyols. The partial ester can be present in quantities of 0.2 to 5 parts by weight per part by weight compounds of Formula I.

The stabilizer compounds in accordance with the invention can if desired be supplemented with additional auxiliaries and processing aids for polyvinyl chloride molding compositions.

The stabilizer combinations can be obtained by simple mechanical mixing of the components with the aid of conventional mixers. During manufacture they are generally obtained as pourable, dust-free products.

EXAMPLES

Preparation of the Compunds of Formula I

1. Sodium Salts of Pyruvic Acid 10 g (0.11 mol) commercial pyruvic acid (Merck) were stirred with 4.4 g (0.11 mol) sodium hydroxide in 200 ml water for 30 min at room temperature. Then the water was distilled off in a rotary evaporator and the sodium salt produced was dried at 70° C. in an oil pump vacuum. Yield: 11.2 g.

2. Sodium Salt of 2-Oxooctanoic Acid

In analogy to Preparation Example 1, 10 g (0.063 mol) commercial 2-oxooctanoic acid (Fluka) was converted to the sodium salt. Yield: 11.4 g.

3. Sodium Salt of Phenylglyoxylic Acid

In analogy to Preparation Example 1, 10 g (0.067 mol) commercial phenylglyoxylic acid (Fluka) was converted to the sodium salt. Yield: 10.9 g.

4. Sodium Salt of 3-Oxocaprylic Acid

To a dispersion of 24.2 g (1.05 gram-atom) sodium in 1200 ml toluene under agitation and under a nitrogen atmosphere 162.2 g (1.25 mol) ethyl acetoacetate was added slowly enough so that the internal temperature did not exceed 50° C. Following the end of addition, the mixture was further agitated for 90 min at 50° C. After cooling the mixture to about 10° C., 115 g (0.85 mol) caproic acid chloride was dropped in within 30 min. Following the end of addition, the mixture was heated under agitation for 15 min at 80° C. and then poured over crushed ice. A pH value of about 4 was established in the aqueous mixture with dilute sulfuric acid. Following addition of 1 l ethanol, the toluene phase was separated, washed three times with water/ethanol (9:1) and dried over sodium sulfate. The residue remaining upon distilling off the solvent was agitated for 90 min at room temperature with 250 g of a 30 wt.-% sodium methylate solution in methanol as well as 350 ml methanol for 90 min at room temperature. The reaction mixture was poured over crushed ice. The pH value of the mixture was adjusted to about 4 with dilute sulfuric acid. Then ether extraction was performed. The combined ether extracts were washed with water, dried over sodium sulfate and concentrated. During the fractional distillation of the residue 81.3 g 3-oxocapyrlic acid methyl ester passed over as colorless liquid with $n_D^{20} = 1.430$, at 106°–110° C./12 mbar.

20 g (0.116 mol) 3-oxocaprylic acid methyl ester were dissolved in 100 ml ethanol, and following addition of 4.6 g (0.116 mol) soldium hydroxide in 100 ml water were agitated for 2 hr under moderate heating. Then the water was distilled off in a rotary evaporator and the remaining sodium salt was dried at 70° C. in an oil pump vacuum. Yield: 7.1 g.

5. Potassium Salt of 3-Oxopalmitic Acid

In analogy to Production Example 4, 3-oxopalmitic acid methyl ester was synthesized from myristic acid chloride and then saponified with potassium hydroxide to the potassium salt of 3-oxopalmitic acid.

6. Sodium Salt of 3-Oxoglutaric Acid

In analogy to Preparation Example 1, 10 g (0.068 mol) commercial 3-oxoglutaric acid (Fluka) were converted to the sodium salt. Yield: 11.2 g.

EXAMPLES A THROUGH G

The thermoplastic molding composition A (comparison composition) was obtained by mechanically mixing 100 parts by weight suspension PVC (K-value 70; Vestolit ® S 7054; manufacturer: Chemische Werke Hüls AG, Marl)
0.2 parts by weight stearic acid
0.2 parts by weight paraffin, m.p. 71° C.
0.5 parts by weight pentaerythritol ester of stearic acid (molar ratio 1:1.5; hydroxyl number 212)
with a stabilizer combination A', consisting of
1.0 parts by weight calcium stearate
0.5 parts by weight zinc stearate.

For preparing the polyvinyl chloride molding compositions B through G in accordance with the invention the stabilizer combination A' was converted to the stabilizer mixtures B' through G' by adding in each case 0.5 parts by weight of the compounds of Formula I. The following were incorporated as compounds of Formula I:

In B': sodium alt of pyruvic acid (Preparation Example 1)

In C': sodium salt of 2-oxooctanoic acid (Preparation Example 2)

In D': sodium salt of phenylglyoxylic acid (Preparation Example 3)

In E': sodium salt of 3-oxocaprylic acid (Preparation Example 4)

In F': potassium salt of 3-oxopalmitic acid (Preparation Example 5)

In G': disodium salt of 3-oxoglutaric acid (Preparation Example 6).

The compositions of the stabilized polyvinyl chloride molding compositions A through G obtained in this manner can be taken from the following table.

The stabilizing effect of the combinations A' through G' in the corresponding polyvinyl chloride molding compositions A through G was investigated on the basis of the "static thermal stability" of rolled sheets. For this purpose the molding compositions were processed into test sheets on a laboratory roller unit with dimensions of 350×150 mm (Schwabenthan Company) at a roller temperature of 170° C. and a roller speed of 300 rpm in a 5 min synchronization. The sheets, ca. 0.5 mm thick, were cut into square test pieces with edge lengths of 10 mm, which were subsequently exposed to a temperature of 180° C. in a drying oven with six roating racks (Heraeus FT 420 R). At 10 minute intervals samples were taken and their color change evaluated. Table 1 below in each case gives the time period after which the test was terminated because of excessive discoloration (stability breakdown).

TABLE 1

| Component (parts by weight) | Polyvinyl chloride molding composition | | | | | | |
|---|---|---|---|---|---|---|---|
| | A | B | C | D | E | F | G |
| Suspension PVC | 100 | 100 | 100 | 100 | 100 | 100 | 100 |
| Calcium stearate | 1.0 | 1.0 | 1.0 | 1.0 | 1.0 | 1.0 | 1.0 |
| Zinc stearate | 0.5 | 0.5 | 0.5 | 0.5 | 0.5 | 0.5 | 0.5 |
| Stearic acid | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 |
| Pyruvic acid, Na salt | — | 0.5 | — | — | — | — | — |
| 2-oxooctanoic acid, Na salt | — | — | 0.5 | — | — | — | — |
| Phenylglyoxylic acid, Na salt | — | — | — | 0.5 | — | — | — |
| 3-oxocaprylic acid, Na salt | — | — | — | — | 0.5 | — | — |
| 3-oxopalmitic acid, Na salt | — | — | — | — | — | 0.5 | — |
| 3-oxoglutaric acid, Di—Na salt | — | — | — | — | — | — | 0.5 |
| Stability breakdown (min) | 40 | 70 | 60 | 60 | 80 | 70 | 70 |

EXAMPLES H to M

The following stabilizer combinations were prepared by mechanically mixing the components:

H':
1.0 parts by weight calcium stearate
0.5 parts by weight zinc stearate
0.5 parts by weight sodium salt of 2-oxooctanoic acid (Preparation Example 2)
0.5 parts by weight sodium aluminosilicate I':
1.0 parts by weight calcium stearate
0.5 parts by weight zinc stearate
0.5 parts by weight sodium salt of phenylglyoxylic acid (Preparation Example 3)
0.5 parts by weight sodium aluminosilicate J':
1.0 parts by weight calcium stearate
0.5 parts by weight zinc stearate
0.5 parts by weight sodium salt of 3-oxocaprylic acid (Preparation Example 4)

0.5 parts by weight sodium aluminosilicate

K':
1.0 parts by weight calcium stearate
0.5 parts by weight zinc stearate
0.5 parts by weight sodium salt of 2-oxooctanoic acid (Preparation Example 2)
0.5 parts by weight mercaptosuccinic acid didecyl ester L':
1.0 parts by weight calcium stearate
0.5 parts by weight zinc stearate
0.5 parts by weight sodium salt of phenylglyoxylic acid (Preparation Example 3)
0.5 parts by weight mercaptosuccinic acid didecyl ester M':
1.0 parts by weight calcium stearate
0.5 parts by weight zinc stearate
0.5 parts by weight sodium salt of 3-oxocaprylic acid (Preparation Example 4)
0.5 parts by weight mercaptosuccinic acid didecyl ester In the stabilizer combinations H', I' and J', a finely divided synthetic zeolite NaA (Na$_2$O:Al$_2$O$_3$:SiO$_2$=0.9:1.2.4; water content 19 wt-%) was used as the sodium aluminosilicate.

The thermoplastic molding compositions H through M were obtained by mechanically mixing 2.5 parts by weight of the stabilizer combinations H' through M' in each case with 100 parts by weight suspension PVC (K value 70; Vestolit ® S 7054; manufacturer: Chemische Werke Hüls AG, Marl)
0.2 parts by weight stearic acid
0.2 parts by weight paraffin, m.p. 71° C.
0.5 parts by weight pentaerythritol ester of stearic acid (Molar ratio 1:1.5; hydroxyl number 212).

The compositions of the stabilized polyvinylchloride molding compositions H through M can be seen in Table 2 which follows.

The stabilization effect of the combinations H' through M' in the corresponding PVC molding compositions H through M was once again investigated based on the "static thermostability" of roller sheets. In Table 2 in each case the time period is given after which the first discoloration of the samples was observed (0 min means that the first discoloration was already present before thermal treatment) as well as the time after which the test was ended because of excessive discoloration (stability breakdown).

We claim:

1. Stabilized polyvinyl chloride molding compositions containing a stabilizer combination consisting of (1) a primary stabilizer selected from the group consisting of metal soaps, aromatic metal carboxylates, metal phenolates, and organotin compounds, (2) a co-stabilizer having the structural formula:

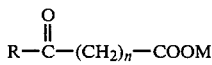

wherein R represents an alkyl group with 1 to 19 carbon atoms, a cycloalkyl group with 5 or 6 carbon atoms, a phenyl group, an alkylphenyl group with 7 to 11 carbon atoms, or an MOOC—CH$_2$ group; n represents the numbers 0 or 1; and M represents lithium, sodium or potassium; said co-stabilizer being present in an amount of from about 0.02 to about 5 parts by weight, based on 100 parts by weight of said polyvinyl choride, and (3) from about 0.2 to about 5 parts by weight, based on 100 parts by weight of said polyvinyl chloride, of a synthetic, crystalline, finely-divided sodium aluminosilicate containing 13 to 25% by weight of bound water which, based on the anhydrous form, has the composition 0.7–1.1Na$_2$.Al$_2$O$_3$.1.3–2.4SiO$_2$.

2. Stabilized polyvinyl chloride molding compositions in accordance with claim 1, wherein said primary stabilizer is a metal soap selected from the group consisting of calcium soap, barium soap, and zinc soap, and is present in an amount of from about 0.1 to 3 parts by weight, based on 100 parts by weight of said polyvinyl chloride.

3. Stabilized polyvinyl chloride molding compositions in accordance with claim 2 wherein said metal soap is derived from fatty acids containing 8 to 22 carbon atoms.

4. Stabilized polyvinyl chloride molding compositions in accordance with claim 1, including from about 0.2 to about 5 parts by weight, based on 100 parts by weight of said polyvinyl chloride, of a compound having the formula selected from the group consisting of:

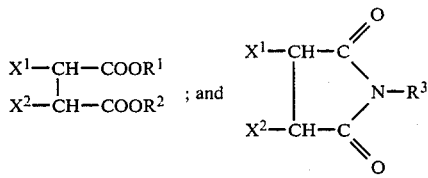

wherein X$^1$ and X$^2$ independently of one another represent hydrogen or the SH group, wherein at least one of the substitutents X$^1$ and X$^2$ represents an SH group and in which R$^1$, R$^2$ and R$^3$ represent straight-chain and branched alkyl groups with 5 to 22 carbon atoms.

5. A stabilizer combination for polyvinyl chloride molding compositions consisting of (1) a primary stabilizer selected from the group consisting of metal soaps, aromatic metal carboxylates, metal phenolates, and organotin compounds, (2) a co-stabilizer having the structural formula:

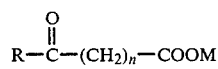

wherein R represents an alkyl group with 1 to 19 carbon atoms, a cycloalkyl group with 5 or 6 carbon atoms, a phenyl group, an alkylphenyl group with 7 to 11 carbon atoms, or an MOOC—CH$_2$ group; n represents the numbers 0 or 1; and M represents lithium, sodium or potassium; said co-stabilizer being present in an amount of from about 0.02 to about 5 parts by weight, based on 100 parts by weight of said polyvinyl chloride, and (3) about 0.2 to about 5 parts by weight, based on 100 parts by weight of said polyvinyl chloride, of a synthetic, crystalline, finely-divided sodium aluminosilicate containing 13 to 25% by weight of bound water which, based on the anhydrous form, has the composition 0.7–1.1Na$_2$O.Al$_2$O$_3$.1.3–2.4SiO$_2$.

6. A stabilizer combination for polyvinyl chloride molding compositions in accordance with claim 5 wherein said primary stabilizer is a metal soap selected from the group consisting of calcium soap, barium soap, and zinc soap, and is present in an amount of from about 0.1 to 3 parts by weight, based on 100 parts by weight of said polyvinyl chloride.

7. A stabilizer combination for polyvinyl chloride molding compositions in accordance with claim 6 wherein said metal soap is derived from fatty acids containing 8 to 22 carbon atoms.

8. A stabilizer combination for polyvinyl chloride molding compositions in accordance with claim 5 including from about 0.2 to about 5 parts by weight, based on 100 parts by weight of said polyvinyl chloride, of a compound having the formula selected from the group consisting of:

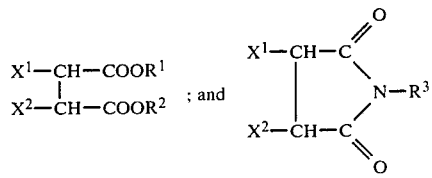

wherein $X^1$ and $X^2$ independently of one another represent hydrogen or the SH group, wherein at least one of the substituents $X^1$ and $X^2$ represents an SH group and in which $R^1$, $R^2$ and $R^3$ represent straight-chain and branched alkyl groups with 5 to 22 carbon atoms.

* * * * *